INVENTORS.
JESSE I. ANDERSON
DALE G. OLSON

INVENTORS.
JESSE I. ANDERSON
DALE G. OLSON

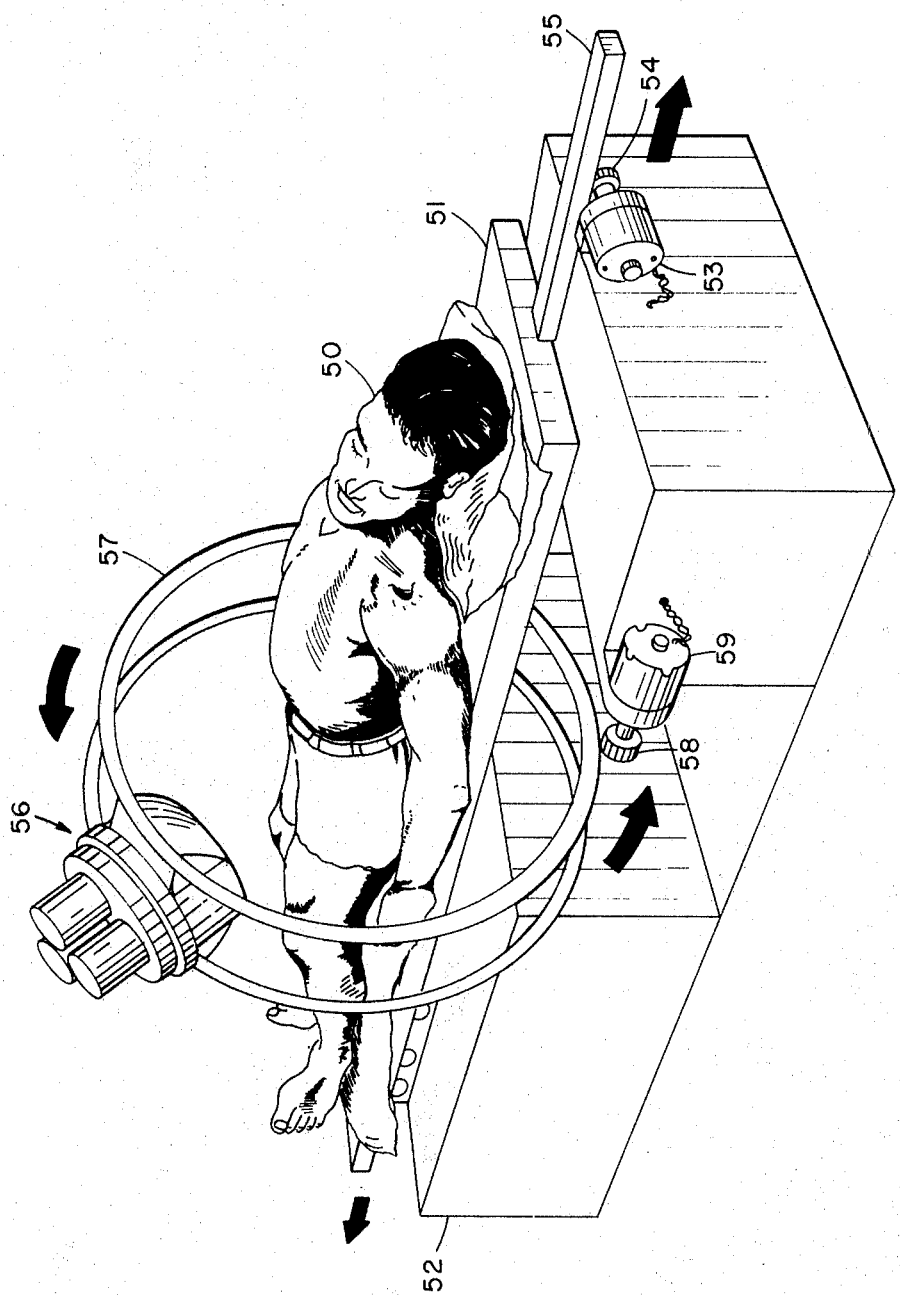

United States Patent Office 3,431,413
Patented Mar. 4, 1969

3,431,413
ROTATIONAL TECHNIQUE FOR ASSESSING
QUANTITY AND DISTRIBUTION OF BODY
RADIOACTIVITY
Jesse I. Anderson and Dale G. Olsen, Idaho Falls, Idaho, assignors to the United States of America as represented by the United States Atomic Energy Commission
Filed Nov. 10, 1966, Ser. No. 594,320
U.S. Cl. 250—71.5　　　　　　　　　　　　　　5 Claims
Int. Cl. G01t 1/16; H01j 39/00

ABSTRACT OF THE DISCLOSURE

A method of whole-body radioactivity scanning and counting of a subject providing a helical scan pattern. This is accomplished by simultaneously providing relative longitudinal and rotational movement between a radiation detector and a subject and counting the signals emanating from the detector during the scan.

---

This invention relates to radiation detection and more particularly relates to an improved method of whole-body counting and whole-body scanning using a rotational technique.

In vivo measurements and detection of radiation are well known for the protection and safety of persons exposed to radiation directly or indirectly as a result of their natural environment or due to the ingestion of radioactivity as used in clinical medical diagnostic techniques. Measurements are frequently desired to determine namely the quantity, the quality and the location of radionuclides within the body.

Apparatus for determining the quantity of radionuclides inside the body by in vivo measurements are referred to as whole-body counters while apparatus for locating the position of radioactive sources are referred to as whole-body scanners.

Two factors which limit the accuracy of in vivo measurements are the anatomical differences of the body and the differences of distribution of the radioactivity therein since these factors affect the amount of attenuation of the radioactivity and the spacing or distance between the source of radioactivity and the detector.

Presently used whole-body counting methods thus are relatively inaccurate for in vivo determinations of radionuclides in human subjects because the distribution of the activity within the body as well as the configuration of the body have a pronounced affect on the detection efficiency.

Accordingly, it is an object of this invention to provide an improved whole-body counter which overcomes the disadvantages of the prior art by providing relative longitudinal and rotary movement between the subject and the radiation detector.

A still further object is to provide in vivo measurements for radionuclides which are relatively independent of differences in the distribution of the radioactivity within the human body.

Further objects and aspects of this invention will be clear upon reading the complete description of the invention in which:

FIG. 5 is a further embodiment of the invention showing rotation and translation of the detector with the subject stationary.

The invention provides a method and apparatus for obtaining a whole-body count with results which are relatively independent of absorption of the radioactivity by the body or of differences of distribution of the radioactivity within the body by providing both relative rotation and longitudinal movement between the body and the detectors. The invention also provides a method of obtaining a helical scan to determine the position of activity in the body.

The problems with in vivo measurements will be appreciated when one considers the manner in which radioisotopes are used in diagnostic medicine. Radioisotopes may be injected into or ingested by a patient in either a soluble or insoluble form. Insoluble ingested isotopes merely pass through the gastrointestinal tract during a time period as a tracer. Soluble isotopes pass into the blood stream and then into various organs.

Subsequently it may be desired to know the location of the isotope or what percentage thereof is in one particular organ, or alternatively it may be desired to know the total radiation level or count of the whole body of one or all the isotopes therein. Similarly, the same information may be desired for a person who has been exposed to radiation accidentally or otherwise.

The accurate detection of such radiation is difficult because the insoluble isotope acts as a point source while the soluble isotope could be metabolized and distributed throughout the body. In both cases, as the isotope moves throughout the body, the distance between the isotope and the detector (exterior of the body) varies as does the amount of body absorbing material. For example, the detected omission from an isotope lodged near bone matter or on the posterior portion of the body will be less than from the anterior portion of the body. Therefore, the detected count rate will normaly be high if the isotope is near the detector or is positioned in an organ having low absorption characteristics.

Another factor of concern is that a radioactive source may be a combination of isotopes, each having different strength or activity and which may each move within the body at different speeds and concentrate in different locations. In such an instance, a weaker isotope which is closer to the detector may have more affect on the whole-body count than a stronger isotope at a different location within the body.

Figure 1:
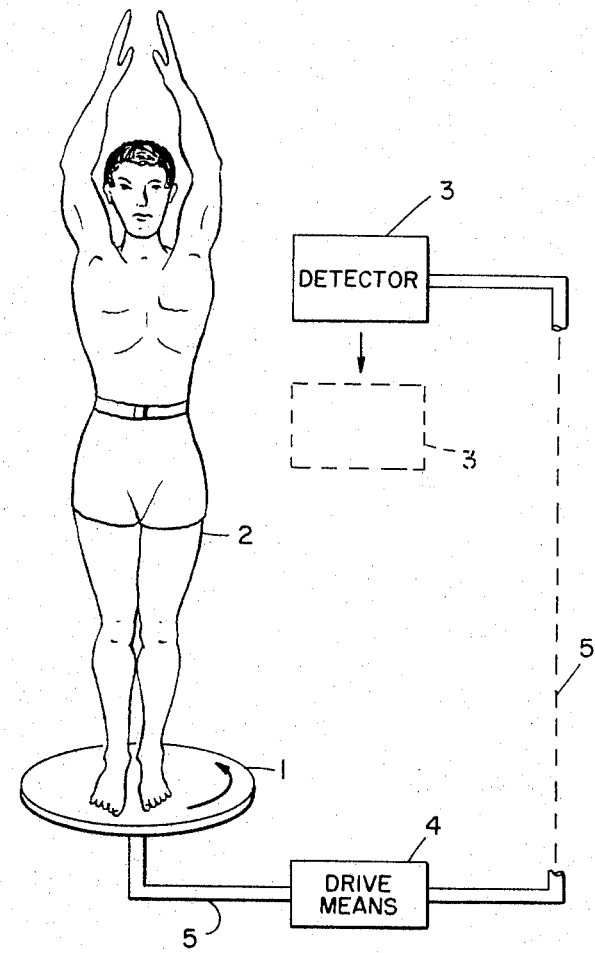
FIG. 1 is a diagrammatic illustration showing relative longitudinal and rotational movement between a subject and a radiation detector with the subject rotated.

According to this invention, the problems of anatomical differences or heterogeneous distribution of activity for whole-body counting are minimized as shown in FIG. 1 by employing relative rotation between the body and the radiation detector, preferably of the scintillation type. It will be appreciated that either the body or the detectors may be rotated but for convenience in illustration, FIG. 1 shows a variable speed turntable 1 for rotating a subject 2 while radiation detector 3 is simultaneously moved longitudinally along the length of the subject. A drive means 4 and mechanical linkage 5 is shown for providing simultaneous movement.

Figure 2:
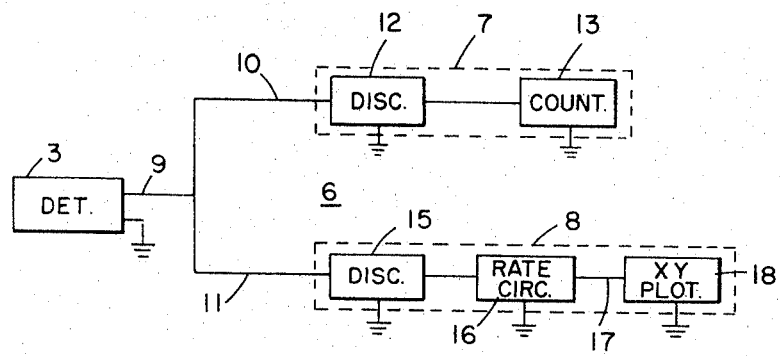
FIG. 2 is a block diagram of the detector circuitry.

As shown in FIG. 2, the electrical output of detector 3 is connected in parallel to a gamma ray spectrometer 7 and a count rate circuit 8. The spectrometer 7 includes a discriminator 12 and counter 13. The count rate circuit includes a discriminator 15, a rate circuit 16 and an x–y plotter 18. The discriminators may be adjusted to select pulses of a particular amplitude which are characteristic of the particular radiation desired to be detected. Thus during a complete scan of an individual two outputs are provided. The output from the gamma ray spectrometer will indicate the total count of a particular source or all the radiation received and is therefore a whole-body count. The counting rate circuit 8, however, is continually providing information on the detected count rate at any particular time during the scan and these results are plotted at 18. Thus, we will be shown in FIG. 4, when the plotting paper is correlated to the position of detector during the scan, it will be apparent that the plotted information indicates the rate of radiation received from any portion of the body and this information is whole-body scan information.

The operation of FIGS. 1 and 2 may be described as follows. If Iodine 131 is injected into a patient, the patient is rotated and the detector 3 is slowly moved downward from the head to the foot of the patient. Gamma rays characteristic of Iodine 131 will be radiated and with the discriminators 12 and 15 adjusted to pass these rays counter 13 indicates the whole-body count while whole-body scanning information is available at plotter 18.

Figure 4:
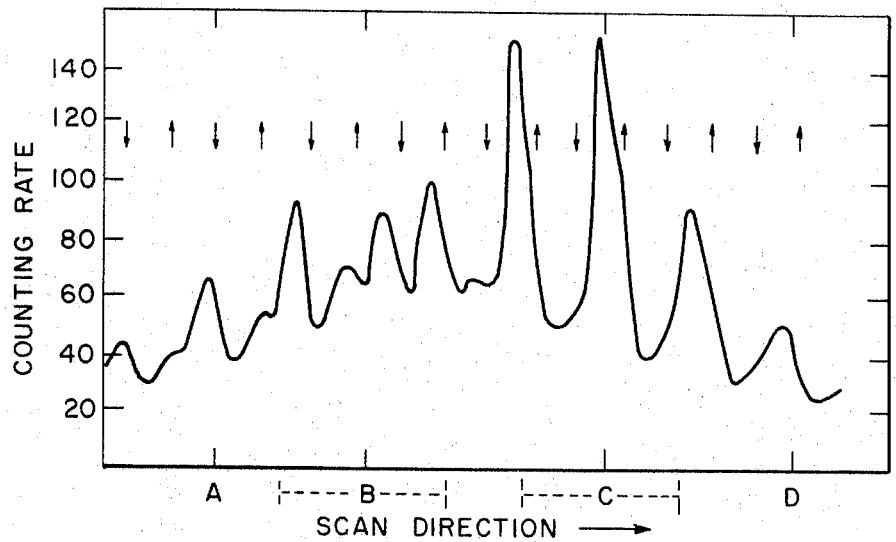
FIG. 4 shows a graph of the counting rate detected during a complete helical scan of a manikin containing radioisotopes.

The plotter 18 includes motor-driven graph paper on which a pen records the varying count rate (obtained at 16) with respect to different portions of the body scanned as will be clear from the discussion of FIG. 4.

It will be seen that the resulting rotary and longitudinal motion between the subject and the detector in FIG. 1 results in a helical scan pattern, the pitch of which is determined by the relative relationship between the rotary and longitudinal speed.

The result of providing relative rotation between the body and the detector is the elimination of the effects caused by differences in body absorption and change in location of the radioactivity; essentially the effect of these factors has been averaged. For example, if a high intensity source is located in the individual's back while the detector is directly in front of the individual, the body will absorb much of the radiation so that a low count is detected; however, as the body is rotated 180°, the count rate will be similarly increased. Accordingly, if the count rate is taken over a period of time greater than or at least equal to one revolution of the body, the total count rate is averaged and will indicate a high intensity source.

Figure 3A:
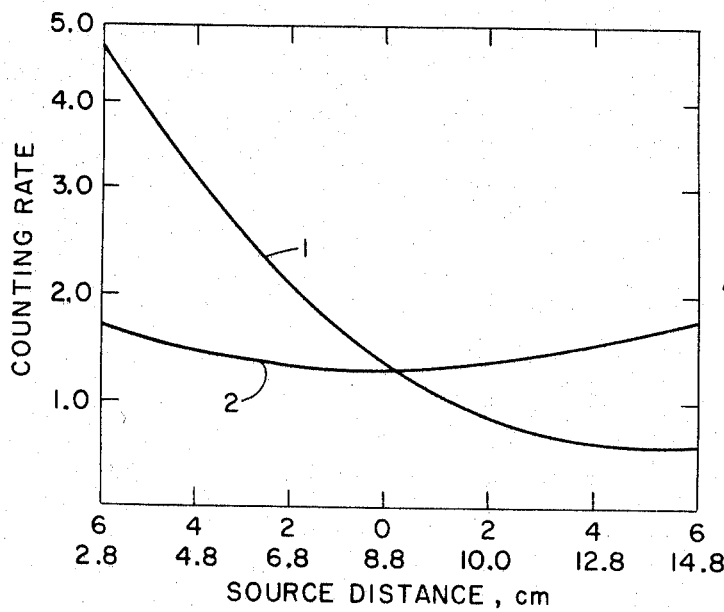
FIG. 3A is a graph showing the detected count rates when a radioactive source is at different distances from a radiation detector for two examples with and without rotation of the source.
Figure 3B:
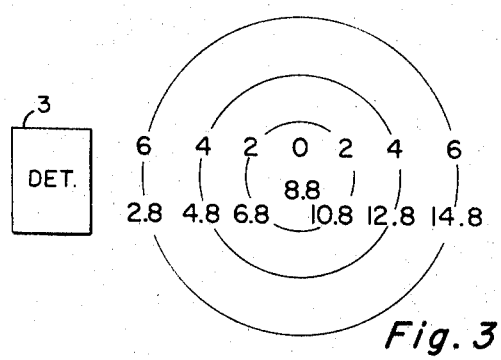
FIG. 3B is a graph showing the relative position of the detector and radioactive source when the radioactive source is rotated to produce the results shown in FIG. 3A.

FIGS. 3A and 3B illustrate the improved results obtained with this invention shown in graph form. A radioactive source was positioned at different distances from the detector, both with and without rotation of the radioactive source.

FIG. 3A shows a graph which indicates the variation in the count rate detected for various radioactive samples versus distance of the sample from the detector for the two cases with and without rotation of the isotopic sample.

Curve number 1 was obtained without rotation while the spacing between the radioactive source and detector was varied from 2.8 cm. to 14.8 cm. Curve number 2 (with rotation) shows the detected count rate when the source is rotated with respect to the detector from a center at distances varying from 2.0 to 6.0 cm. from the axis of rotation of the source.

FIG. 3B shows a diagram of relative position of the radioactive source and detector 3 for obtaining the graphs of FIG. 3A. Curve number 1 of FIG. 3A clearly shows that even in the absence of body absorber, the detected count rate (without rotation) has a considerable variation with distance, namely that as the spacing (on the lower scale) between the radioactive source and detector increases, the count rate decreases in a non-linear manner. In contrast therewith, curve number 2 shows that rotation of the radioactive source with respect to the detector provides a counting rate which is relatively independent of the distance (on the upper scale) between the source and the detector. Further experiments have shown that the presence of an absorber about the source will cause further variations in curve number 1, but cause practically no affect on curve number 2.

The significance of FIG. 3A is that it clearly shows if a source of radioactivity is rotated, the count rate detected will be relatively independent of the geometry or distribution of a source of radioactivity within a body.

The comparison of the results of in vivo whole-body counting of a human subject using the 50 cm. arc (static) and the rotary scanning technique indicates a further advantage of the present invention in that the count rate using this technique is relatively independent of time where radioactivity is present within a patient for as long as 24 hours in direct contrast to the results using the static method. In one test, an Iodine 131 source was taken orally by a patient in the form of a three-layer gelatin capsule. The radionuclide was subjected to the metabolic processes in the body resulting in position changes during a 24-hour time interval. Using the static method of counting, there were substantial variations in the count rate which indicated the inability of that particular technique to compensate for the differences in distribution of the radioactivity during the time period. All whole-body counting data for both methods was corrected for radiological decay and excreted activity. The counts recorded were from the 0.36 mev. photo peak of Iodine 131 integrated over the energy range from 0.31 mev. to 0.44 mev. The Compton contribution from the peaks above 0.36 mev. was subtracted. The rotary scanning technique as applied to the human body showed a relatively constant count rate during the 24-hour period.

FIG. 4 shows a graph of the count rate obtained during a helical whole-body scan of a manikin having sources of radioactivity placed at points therein corresponding to the location of human organs. This system is used to define the location of activity points in the body. The apparatus of FIGS. 1 and 2 was used with the count rate meter 16 connected to the plotter 18. The graph paper on the the plotter is started and stopped at the beginning and end of a scan and otherwise correlated thereto as stated below. Counting rate meter response curves were obtained on the plotter showing detector position on the longitudinal axis of the body as a function of counting rate. The scan of the body by the detector is from the head to the thighs from left to right on the abscissa. Four points are legended on the abscissa as A, B, C and D which correspond respectively to the thyroid, lungs, kidneys and gonads. The orientation of the body with respect to the detector expressed in degrees is indicated by arrows along the top of the graph. An arrow pointing downward indicates zero degrees orientation of the body with respect to the detector and represents a position of the body on the turntable with the body facing directly toward the scanning detector. It will be understood that by rotating the arrows clockwise in the direction of the scan, one can show the body orientation with respect to the detector for any count rate shown on the graph. The drawing thus shows the position of the radionuclides in the body. The curve shown in FIG. 4 was obtained by scanning a life-size manikin with radioactive sources positioned in the kidney and lung, using an 8 inch x 4 inch detector. The manikin body was rotated at 0.6 r.p.m. as the detector moved longitudinally along the body at 2.2 inches per minute. Count rate peaks are visible on the graph each time either the kidney or lung is at a position of minimum distance with minimum absorber between the source and the detector. The peaks resulting from lung activity predominate during approximately the first 12 inches along the body (B-area). The high peak from lung contribution was at 8 inches, occurring at the point over the upper half of the lung at the beginning of the B-area. The body orientation at this peak was with the right side of the body toward the detector (315°). The counting rate contribution from the kidney predominates at distances greater than 12 inches along the body with peaks of equal height occurring in the C-area at 17.5 inches and 21.5 inches. The peaks from kidney contribution occur repeatedly with the body orientation at 135° with the detector position in line with the left kidney.

In summary, the results of experiments indicate that the rotary scanning technique of whole-body counting and scanning in this invention is an effective method of montoring human subjects for internal exposures to radionuclides. The method is simple and reliable, rendering information concerning the amount and position of radionuclides in the body in a single counting operation. The sensitivity for the new method is comparable with conventional methods of static counting and the results are much more accurate. While the subject has been rotated as described, it is clear that the scope of this invention includes rotating detectors, and while described particularly for in vivo measurements, it is equally applicable to the detection of radionuclides in large bulky samples of all types in which the same problems are presented.

In the embodiment of the invention illustrated in FIG. 5, the patient 50 is laid on a table 51 having low absorption characteristics. The table 51 is mounted on a stationary platform 52 by well known roller means so as to provide longitudinal movement in the direction of the arrows of table 51 with respect to platform 52. Table 51 is moved by means of motor 53 driving pinion gear 54 along rack gear 55. The detector 56 is mounted on an annular gear 57 which is rotated by gear 58 and motor 59 in the direction of the arrows.

In the operation of the embodiment in FIG. 5, motor 59 drives the gears 57 and 58 so as to rotate detector 56 around patient 50 while motor 53 longitudinally moves table 51 by means of rack and pinion bears 54 and 55. Thus, the movement of the detector 56 and table 51 results in a helical scan of the patient 50.

It will be understood that various changes in the details, materials and arrangement of the parts, which have been herein described and illustrated in order to explain the nature of the invention, may be made by those skilled in the art within the principles and scope of the invention as expressed in the appended claims.

We claim:
1. A method of whole-body radioactivity scanning and counting of a subject comprising the steps of:
   scanning said subject by providing simultaneous relative rotational and longitudinal movement between a radiation detector and said subject to provide a helical scan pattern and
   counting the signals emanating from said radiation detector during a scan.

2. The method of claim 1 wherein the step of scanning includes the steps of:
   rotating said radiation detector around an axis of rotation approximately corresponding to the longitudinal axis of said subject and
   simultaneously longitudinally moving said subject along said longitudinal axis.

3. The method of claim 1 wherein the step of scanning includes the steps of:
   rotating said subject around an axis of rotation approximately corresponding to the longitudinal axis of said subject and
   simultaneously longitudinally moving said radiation detector parallel to said longitudinal axis of said subject.

4. The method of claim 1 wherein the step of counting includes the steps of:
   measuring the count rate of detected radiation during said scan and
   recording the detected count rate on a time base equal to the time utilized for said scan.

5. The method of claim 1 wherein the step of counting includes the steps of:
   measuring the total detected radiation during said scan and
   recording said total detected radiation.

References Cited
UNITED STATES PATENTS

| | | | |
|---|---|---|---|
| 3,082,322 | 3/1963 | Koerner et al. | 250—61.5 |
| 3,293,436 | 12/1966 | Wilcox | 250—71.5 X |

OTHER REFERENCES

A Linear Scanner for Human Radioisotope Research, by A. C. Morris, Jr., published by U.S. Atomic Energy Commission, March 1960, Orins–33, pp. 1 to 26.

ARCHIE R. BORCHELT, *Primary Examiner.*

U.S. Cl. X.R.

250—52